United States Patent
Fukuda et al.

(10) Patent No.: US 8,072,544 B2
(45) Date of Patent: Dec. 6, 2011

(54) VIDEO OUTPUT APPARATUS AND CONTROL METHOD THEREOF

(75) Inventors: Tetsu Fukuda, Yokohama (JP); Hiroshi Uchiike, Fujisawa (JP); Kenichi Morikawa, Kawasaki (JP); Shuntaro Aratani, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 12/307,842

(22) PCT Filed: Aug. 28, 2007

(86) PCT No.: PCT/JP2007/067109
§ 371 (c)(1),
(2), (4) Date: Jan. 7, 2009

(87) PCT Pub. No.: WO2008/029750
PCT Pub. Date: Mar. 13, 2008

(65) Prior Publication Data
US 2009/0310016 A1    Dec. 17, 2009

(30) Foreign Application Priority Data
Sep. 7, 2006 (JP) ................................. 2006-243398

(51) Int. Cl.
H04N 9/74 (2006.01)
H04N 5/46 (2006.01)
(52) U.S. Cl. ......................... 348/581; 348/558; 348/600
(58) Field of Classification Search .................. 348/561, 348/562, 581, 582, 705, 706, 589, 600, 558; 345/660; 382/298–300; H04N 5/46, 9/74, H04N 9/76, 5/268
See application file for complete search history.

(56) References Cited

U.S. PATENT DOCUMENTS

| | | | |
|---|---|---|---|
| 6,473,088 B1 | 10/2002 | Matsumoto et al. | 345/530 |
| 6,504,826 B1 | 1/2003 | Kato et al. | 370/312 |
| 6,614,439 B2 | 9/2003 | Matsumoto et al. | 345/530 |
| 7,148,909 B2 | 12/2006 | Yui et al. | 345/660 |
| 7,646,430 B2 * | 1/2010 | Brown Elliott et al. | 348/581 |
| 7,911,536 B2 * | 3/2011 | Dunton | 348/581 |
| 2005/0231641 A1 | 10/2005 | Suito | 348/555 |

FOREIGN PATENT DOCUMENTS

| | | |
|---|---|---|
| JP | 11-119757 A | 4/1999 |
| JP | 2001-346125 | 12/2001 |
| JP | 2002-84474 | 3/2002 |
| JP | 2002-354364 | 12/2002 |
| JP | 2003-338993 A | 11/2003 |
| JP | 2004-110046 A | 4/2004 |
| JP | 2005-338113 A | 12/2005 |
| JP | 2006-229781 A | 8/2006 |

OTHER PUBLICATIONS

International Search Report and Written Opinion in PCT/JP2007/067109. Japanese Office Action dated Jul. 22, 2011, in related Japanese Patent Application No. 2006-243398.

* cited by examiner

Primary Examiner — Sherrie Hsia
(74) Attorney, Agent, or Firm — Fitzpatrick, Cella, Harper & Scinto

(57) ABSTRACT

There is provided a video output apparatus which inputs a video content that can have at least three different resolutions. A format detector detects an alteration of a resolution of a video content. A scaling processor scales up the video content at a set scale ratio. Upon detection of an alteration of the resolution, the format detector selects one of a plurality of supplemental video pictures, which are prepared in advance in a memory, in accordance with the degree of decrease of the resolution after the alteration to that before the alteration. An image composition unit controls a display unit to display the supplemental video picture together with a video associated with the video content via a video display unit.

12 Claims, 13 Drawing Sheets

FIG. 4

| ABBREVIATION | NAME | BIT LENGTH | CONTENTS |
|---|---|---|---|
| SHC | Sequence Header Code | 32 | START SYNC CODE OF SEQUENCE LAYER (00 00 01 B3) |
| HSV | Horizontal Size Value | 12 | LOWER 12 BITS OF NUMBER OF PIXELS OF IMAGE IN HORIZONTAL DIRECTION |
| VSV | Vertical Size Value | 12 | LOWER 12 BITS OF NUMBER OF LINES OF IMAGE IN VERTICAL DIRECTION |
| ARI | Aspect Ratio Information | 4 | REPRESENT ASPECT RATIO OF IMAGE OR DISPLAY SCREEN |
| FRC | | | |
| | | | ... |
| PS | Progressive Sequence | 1 | INDICATE SEQUENTIAL OPERATIONS |
| CF | | | |
| HSE | Horizontal Size Extension | 2 | UPPER 2 BITS TO BE ADDED TO HSV |
| VSE | Vertical Size Extension | 2 | UPPER 2 BITS TO BE ADDED TO VSV |
| BRE | | | ⋮ |

MESSAGE 1

MESSAGE 2

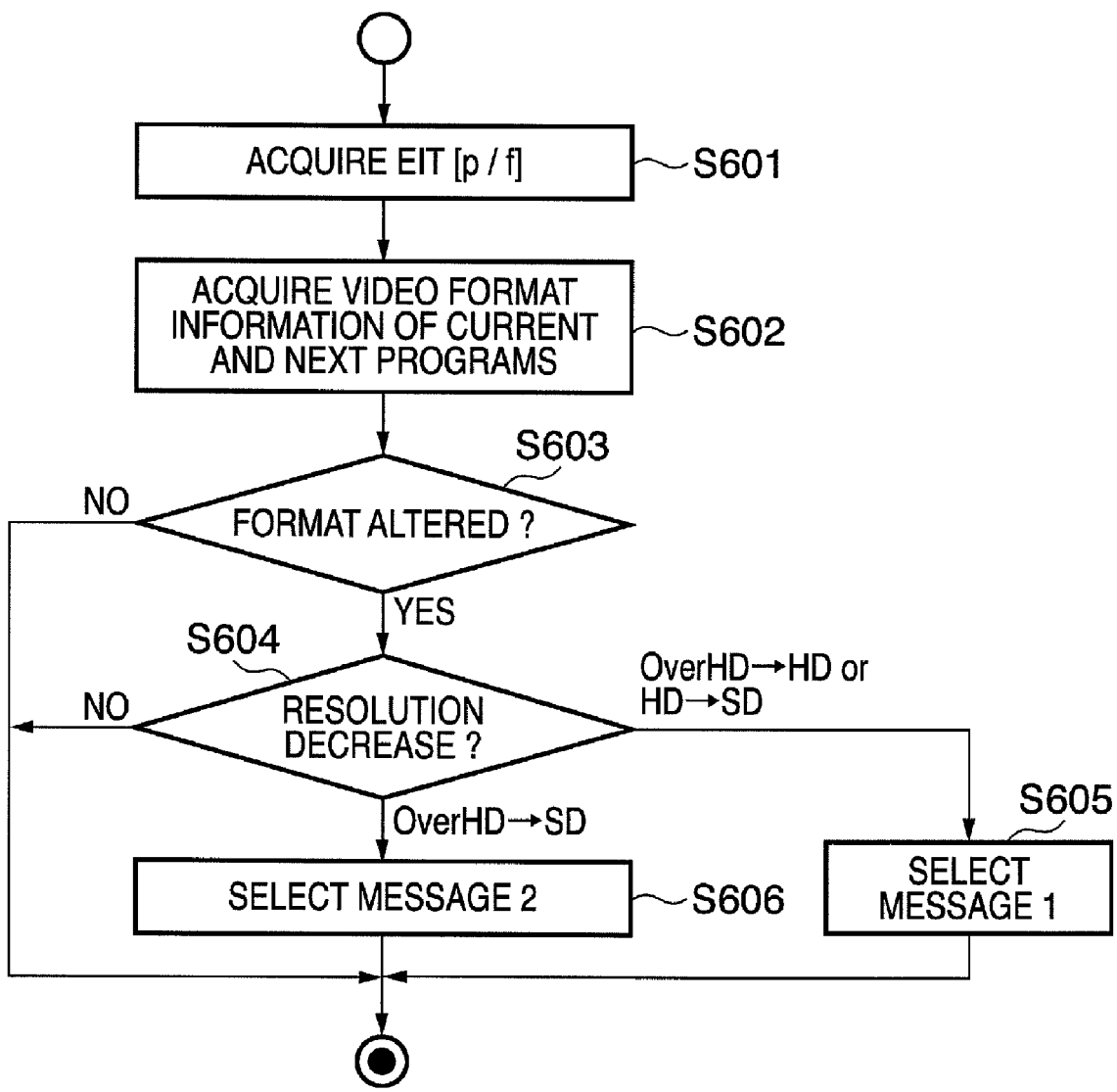

FIG. 10

| | BEFORE CHANGE | | | AFTER CHANGE | | SCALE RATIO | RATIO OF SCALE RATIOS |
|---|---|---|---|---|---|---|---|
| | RESOLUTION | DISPLAY AREA (x, y, w, h) | SCALE RATIO | RESOLUTION | DISPLAY AREA (x, y, w, h) | | |
| MODE 1 | OHD (4000×8000) | (0, 0, 8000, 4000) | 1.0 | HD (1080×1920) | (640, 110, 6720, 3780) | 3.5 | 3.5 |
| MODE 2 | OHD (4000×8000) | (0, 0, 8000, 4000) | 1.0 | SD (480×720) | (2920, 1280, 2160, 1440) | 3.0 | 3.0 |
| MODE 3 | HD (1080×1920) | (448, 2, 7104, 3996) | 3.7 | SD (480×720) | (1480, 320, 5040, 3360) | 7.0 | 1.9 |
| MODE 4 | HD (1080×1920) | (640, 110, 6720, 3780) | 3.5 | SD (480×720) | (1840, 560, 4320, 2880) | 6.0 | 1.7 |

F I G. 12A
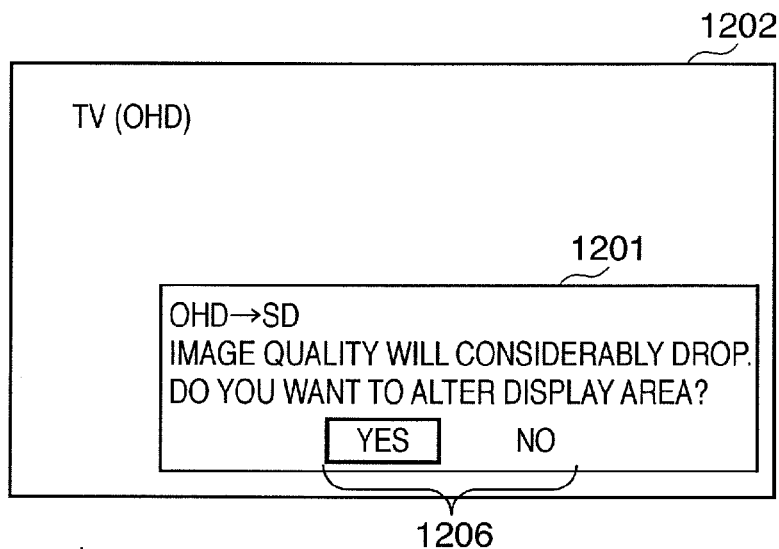
↓ SELECT "YES"
F I G. 12B
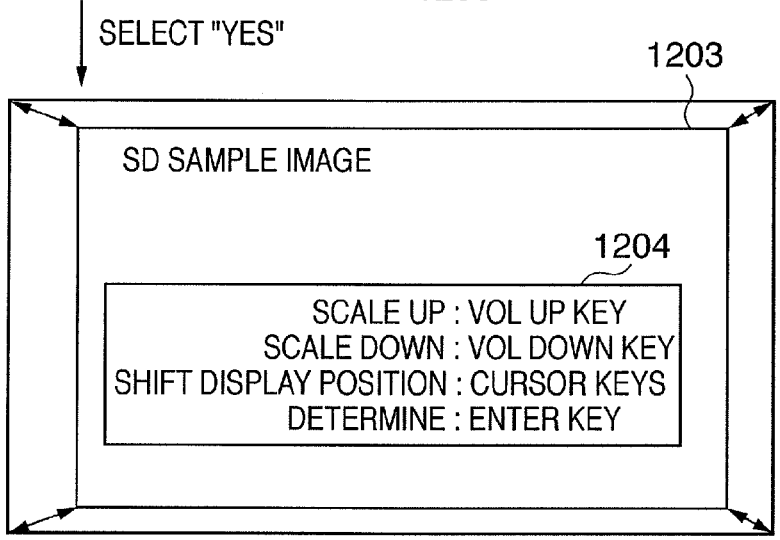
↓ ALTER DISPLAY AREA BY CORRESPONDING KEYS
DETERMINE DISPLAY AREA BY ENTER KEY
F I G. 12C
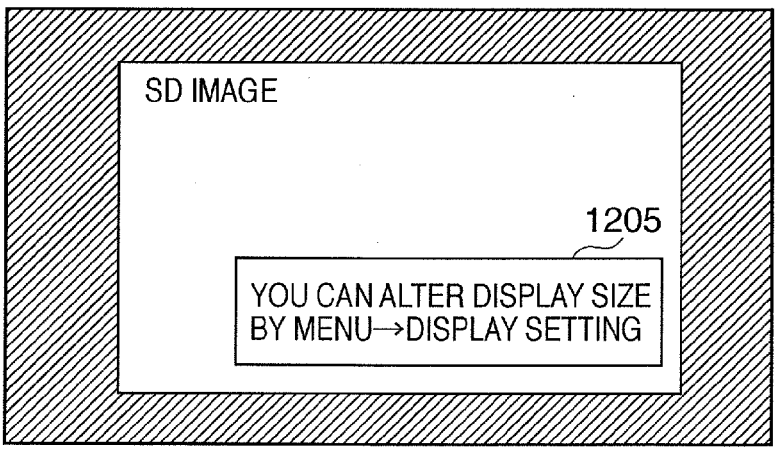

VIDEO OUTPUT APPARATUS AND CONTROL METHOD THEREOF

TECHNICAL FIELD

The present invention relates to a video output apparatus for displaying a video content on, for example, a display apparatus and a control method thereof. More specifically, the present invention relates to a video output apparatus for displaying video content which can have three or more different resolutions on a display apparatus having a predetermined display resolution, and a control method thereof.

BACKGROUND ART

Nowadays, the amount of content broadcast in HD (High-Definition) is gradually increasing. Also, a video format having a still higher resolution (to be referred to as OverHD hereinafter) has been studied. OverHD content has a resolution of about 4000×8000 pixels or higher, and an expected display screen size is about 100 inches. The resolution of SD (Standard-Definition) content is 480×720 pixels, and that of HD content is 1080×1920 pixels. Therefore, when OverHD content is output without reducing its resolution, a high-presence video with a much higher definition than SD and HD can be provided to the user.

Even if an environment that can receive and display high-resolution video content such as OverHD content in each home is realized in the future, it is improbable that content with SD and HD resolutions will disappear immediately. For example, a large number of formats such as OverHD, HD, SD, and the like will be broadcast together for a number of years.

In existing television broadcasting, SD and HD contents are broadcast together in a single channel. There is a technique for displaying a video which informs the user of a video format name after a change of video formats occurs and allows the user to recognize the change of the video formats in a video display apparatus compatible with SD and HD (Japanese Patent Laid-Open No. 2002-354364 (D1)).

When displaying content with a resolution lower than the number of display pixels of a display apparatus, the display apparatus scales video of the content up so as to fully display the content in one of the vertical and horizontal directions of the display apparatus. For example, in the current broadcasting environment, a display apparatus that can display HD content may scale up SD content in the vertical direction and/or horizontal direction in order to display it. In this manner, the number of pixels of the display apparatus can be fully and effectively used, and the user can enjoy the content at a large display size.

However, when a simple scale-up process is performed in correspondence with the number of pixels of the display apparatus, blurred video often results. Note that the simple scale-up process means a scale-up process which generates interpolated pixels using the same pixels as neighboring pixels, and which generates interpolated pixels by calculating interpolated pixel values by linear interpolation using pixel values of neighboring pixels, and the like.

In particular, when a lower-resolution video such as SD content is scaled up and displayed in correspondence with the resolution of an ultra high-definition display apparatus capable of displaying OverHD content, a highly blurred image is displayed. Such phenomenon are conspicuous compared to cases wherein SD content is displayed in a large scale on a display apparatus capable of displaying HD content. In particular, when a user views SD content immediately after viewing OverHD content, he or she may feel as though he or she were experiencing trouble with the display apparatus or with his or her own vision.

By displaying a video that informs the user of the change in video formats, as described in D1, the user can recognize that a considerable alteration in display quality is caused by the change of the video formats. However, even by applying the technique of D1, the user is merely informed of only the fact that the format has changed. For example, when the degree of resolution alteration is large, for example, when the video format changes from OverHD to SD, the user may want to adjust the display method. However, if all that is displayed is the format name of the currently displayed content, the user cannot get information regarding how to adjust the display. This problem may become especially pronounced in the future as the number of available video formats increases.

In another method, low-resolution content may be displayed without being scaled up—in other words, without altering its resolution. In this case, display of a blurred image can be prevented. However, the display size is reduced, thus posing another problem. For example, when SD content is displayed without altering its resolution on an ultra high-definition display apparatus capable of displaying OverHD content having a resolution of 4000×8000 pixels, the display size (the ratio of the display area to the full screen) becomes about 1/100. For this reason, the user may be inconvenienced due to the small display size. A display area of about 99/100 of the display apparatus, in other words, most of the display area is not used for display, and the capability of the display apparatus cannot be fully used.

DISCLOSURE OF INVENTION

The present invention has been made in consideration of the problems of the prior arts, and has as its object to provide a video display apparatus which allows the user to easily take an appropriate measure when the resolution of a video content has altered, and a control method thereof.

It is another object of the present invention to provide a video display apparatus which can eliminate strangeness due to an alteration in resolution of a video content.

According to an aspect of the present invention, there is provided a video output apparatus which comprises input means for inputting a video content having at least three different resolutions, and output means for outputting a video associated with the video content, characterized by comprising: detection means for detecting an alteration of a resolution of the video content; scaling means for scaling up the video content at a set scale ratio and supplying the scaled-up video content to the output means; and control means for, when the detection means detects the alteration of the resolution, selecting one of a plurality of supplemental video pictures, which are prepared in advance, in accordance with a degree of resolution decrease from the resolution before the alteration to the resolution after the alteration, and controlling the output means to output the selected supplemental video picture together with a video associated with the video content.

According to another aspect of the present invention, there is provided a video output apparatus which comprises input means for inputting a video content having at least three different resolutions, and output means for outputting a video associated with the video content, characterized by comprising: detection means for detecting an alteration of a resolution of the video content; scaling means for scaling up the video content at a set scale ratio and supplying the scaled-up video content to the output means; and setting means for, when the detection means detects the alteration of the resolution, determining the scale ratio for the video content after the alteration in accordance with a degree of resolution decrease from the resolution before the alteration to the resolution after the alteration, and setting the determined scale ratio in the scaling means.

According to yet another aspect of the present invention, there is provided a method of controlling a video output apparatus, which comprises input means for inputting a video content having at least three different resolutions, and output means for outputting a video associated with the video content, the method characterized by comprising: a detection step of detecting an alteration of a resolution of the video content; a scaling step of scaling up the video content at a set scale ratio and supplying the scaled-up video content to the output means; and a control step of selecting, when the alteration of the resolution is detected in the detection step, one of a plurality of supplemental video pictures, which are prepared in advance, in accordance with a degree of resolution decrease from the resolution before the alteration to the resolution after the alteration, and controlling the output means to output the selected supplemental video picture together with a video associated with the video content.

According to still another aspect of the present invention, there is provided a method of controlling a video output apparatus, which comprises input means for inputting a video content having at least three different resolutions, and output means for outputting a video associated with the video content, the method characterized by comprising: a detection step of detecting an alteration of a resolution of the video content; a scaling step of scaling up the video content at a set scale ratio and supplying the scaled-up video content to the output means; and a setting step of determining and setting, when the alteration of the resolution is detected in the detection step, the scale ratio for the video content after the alteration in accordance with a degree of resolution decrease from the resolution before the alteration to the resolution after the alteration.

Further features of the present invention will become apparent from the following description of exemplary embodiments with reference to the attached drawings.

BRIEF DESCRIPTION OF DRAWINGS

FIG. 4 shows data included in a sequence header of the MPEG2 video bitstream and some of their contents;

FIG. 6 is a flowchart for explaining a message selection operation to be executed while the user is currently viewing a program using a digital broadcasting receiver according to the second embodiment;

FIG. 10 shows an example of a conversion table used in the digital broadcasting receiver according to the third embodiment;

FIGS. 12A to 12C show examples of GUIs displayed by a digital broadcasting receiver according to the fourth embodiment.

BEST MODE FOR CARRYING OUT THE INVENTION

Preferred exemplary embodiments of the present invention will now be described in detail in accordance with the accompanying drawings.

First Embodiment

Figure 1:
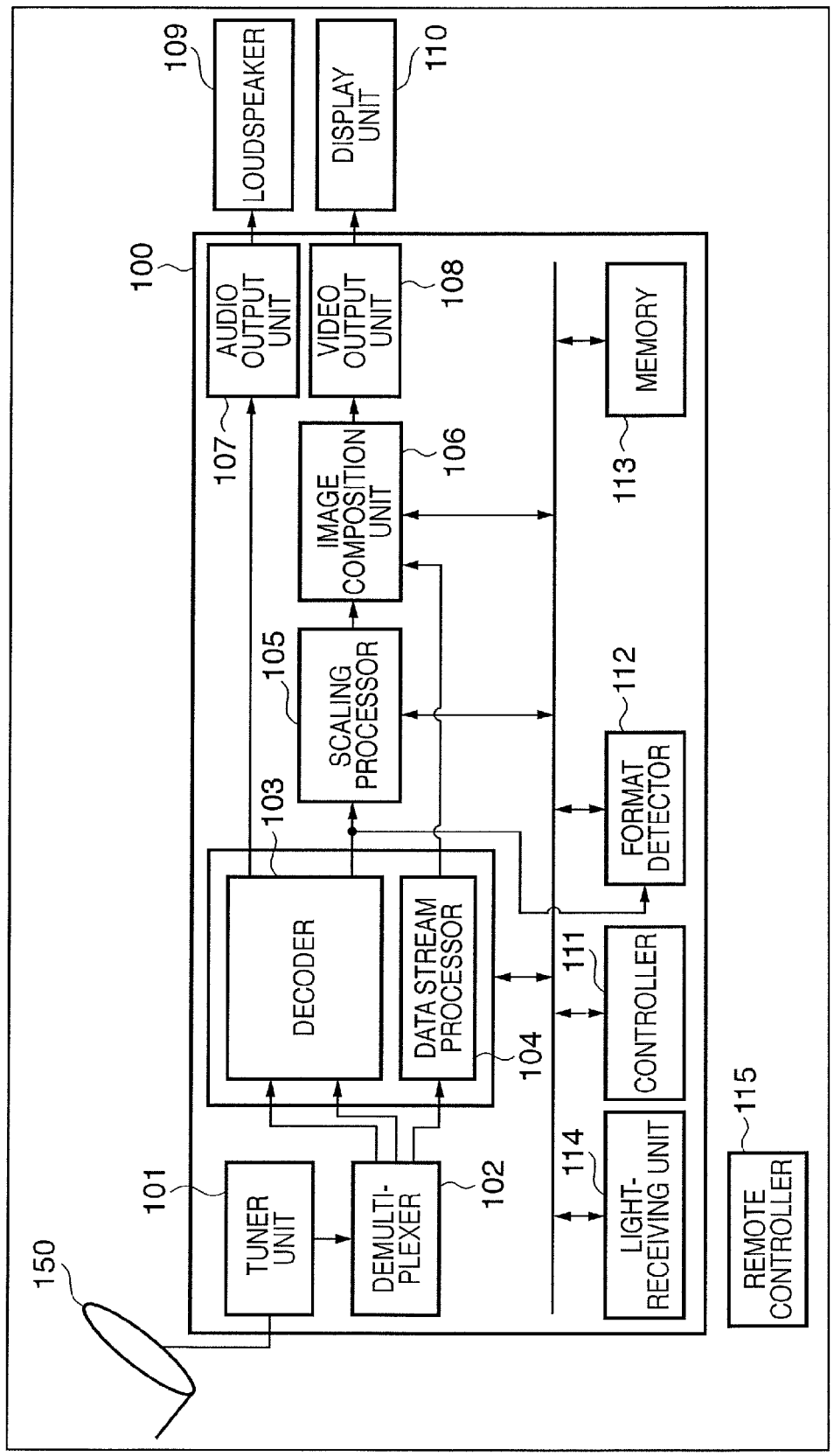
FIG. 1 is a block diagram showing an example of the functional arrangement of a digital broadcasting receiver as a typical example of a video output apparatus according to the first embodiment of the present invention.

FIG. 1 is a block diagram showing an example of the functional arrangement of a digital broadcasting receiver 100 as a typical example of a video output apparatus according to the first embodiment of the present invention.

Referring to FIG. 1, a signal input from an antenna or cable 150 is input to a tuner unit 101. The tuner unit 101 extracts a signal of a designated channel from the input signal, applies processes such as demodulation, error correction, and the like to the extracted signal, and generates digital data of a transport stream (TS) format. In the digital data of the TS format, video data, audio data, electronic program guide (EPG) data, data broadcasting data, and the like are time-divisionally multiplexed.

A demultiplexer 102 demultiplexes video data and audio data from the digital data input from the tuner unit 101, and outputs them to a decoder 103. The demultiplexer 102 also outputs EPG data and data broadcasting data to a data stream processor 104. The video data is a bitstream in MPEG2 video format.

The decoder 103 decodes the video data and audio data, and outputs the video data to a scaling processor 105 and the audio data to an audio output unit 107.

The data stream processor 104 writes the data broadcasting data/EPG data in a memory 113 via a bus. The memory 113 comprises, for example, an at least partially nonvolatile writable storage device.

The scaling processor 105 scales the video data to an appropriate size according to the detection result of a format detector 112 (to be described later), and outputs the scaled video data to an image composition unit 106. Assume that scaling processing that can use a screen of a display unit as much as possible is set as a default. Therefore, a video with a resolution lower than the display resolution is scaled up in at least one of the vertical and horizontal directions in correspondence with the display resolution.

The image composition unit 106 reads out the data broadcasting data or EPG data from the memory 113 as needed under the control of a controller 111, and synthesizes the readout data with the video data from the scaling processor 105. The video data is written in a video output unit 108, and is displayed on a display unit 110. By the synthesis processing of the image composition unit 106, the display unit 110 can display the contents of the EPG or data broadcasting data.

On the other hand, the audio data is decoded by the decoder 103, and is then output to an externally connected loudspeaker 109 via the audio output unit 107.

Assume that the externally connected display unit 110 comprises a large-screen and high-definition display apparatus which has a resolution (the number of pixels) that can display OverHD contents in this embodiment. Note that the resolution of an OverHD content is 4000×8000 pixels.

The format detector 112 detects the format (resolution) of video data based on the decoding result of the decoder 103, and outputs the detection result to the scaling processor 105 via the bus.

The format detector 112 detects a change of the formats of the video data. The format detector 112 reads out message data (supplemental video picture data) selected according to the direction and degree of resolution alteration before and after the change from several types of message data prestored in the memory 113, and outputs the readout message data to the image composition unit 106.

The controller 111 includes, for example, a microprocessor and program ROM. When the microprocessor executes control programs stored in the program ROM, the controller 111 controls the operations of the respective processors of the digital broadcasting receiver 100.

A light-receiving unit 114 receives and demodulates a radio signal from a remote controller 115, and outputs a control code. The remote controller 115 is an instruction input device which allows the user to input instructions of tuning, volume adjustment, EPG display, and the like to the digital broadcasting receiver 100.

Figure 2:
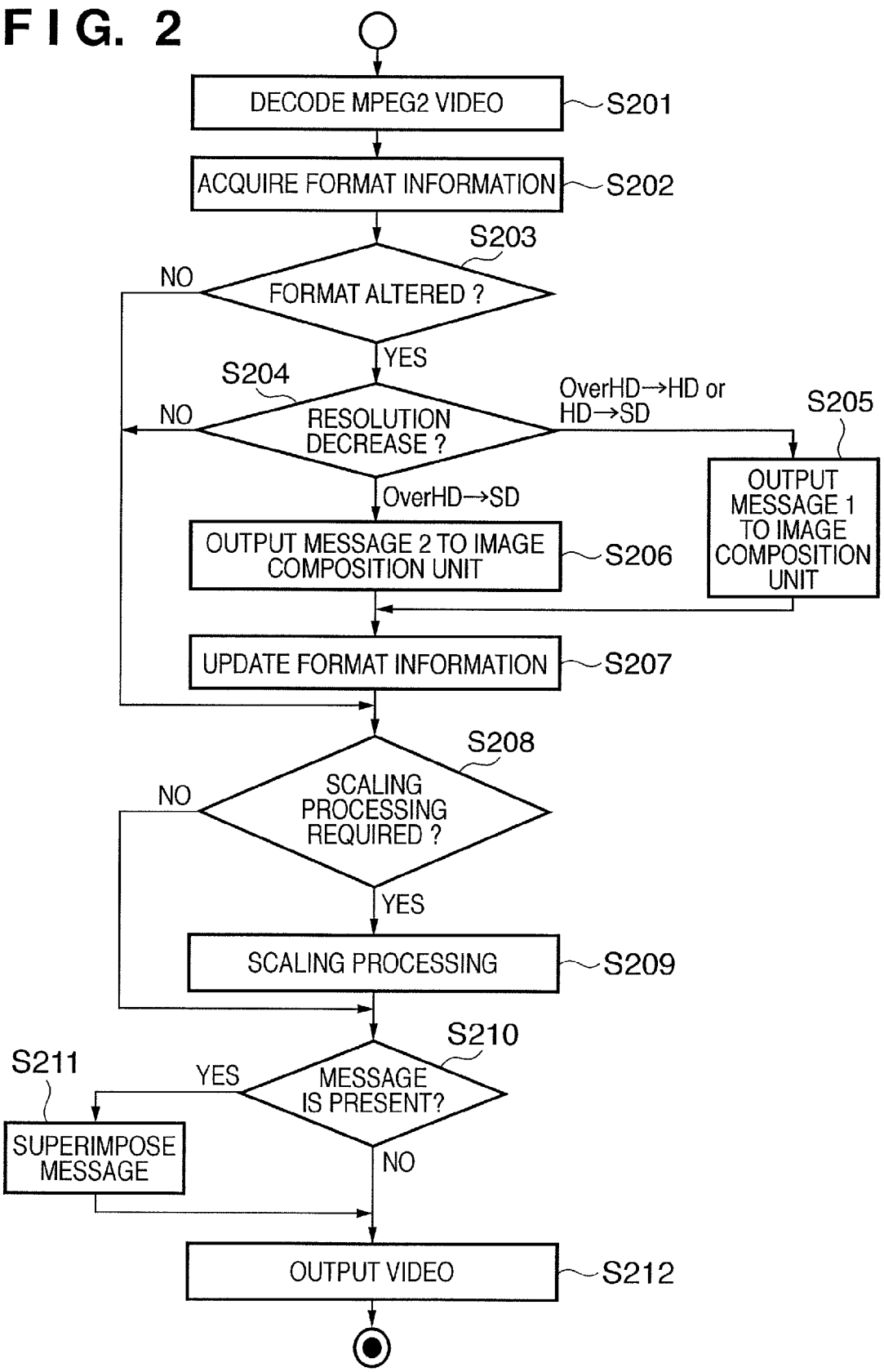
FIG. 2 is a flowchart for explaining an overview of receiving processing in the digital broadcasting receiver according to the first embodiment.

An overview of the receiving processing in the digital broadcasting receiver 100 according to this embodiment will be described below with reference to the flowchart of FIG. 2. The receiving processing is implemented when the controller 111 controls and uses other units.

The decoder 103 applies decoding processing to an MPEG2 video bitstream input from the demultiplexer 102 (S201). The format detector 112 detects video format information from the decoding result of the decoder 103. More specifically, the format detector 112 acquires resolution information described in a sequence header (SH) included in the sequence layer of the MPEG2 video bitstream, and saves the acquired information in the memory 113 (S202). In this embodiment, the format detector 112 acquires video format information from all sequence headers in the bitstream.

The format detector 112 compares the acquired video format information with the immediately preceding video format information saved in the memory 113 to check if the contents have altered (S203). If no alteration is detected, the format detector 112 executes only processing for notifying the scaling processor 105 of the acquired video format information.

The scaling processor 105 checks in step S208 based on the video format information from the format detector 112 and the number of pixels of the display unit 110 whether or not the scaling processing is required.

In this embodiment, the scaling processor 105 checks whether or not the scaling processing is required under the condition that the video data is displayed using all pixels of the display unit 110. If it is determined that the scaling processing is required, the scaling processor 105 applies the scaling process (scale-up processing) to the video data (S209); otherwise, it outputs the video data intact to the image composition unit 106.

The image composition unit 106 confirms if data (EPG data, teletext data, message data, or the like) to be synthesized with the video data is present. In this embodiment, assume that there is no supplemental video picture (message video picture) to be synthesized if no format change is detected for the sake of a simple description and easy understanding. Therefore, the image composition unit 106 outputs the input video data to the video output unit 108. The video output unit 108 outputs the input video data to the display unit 110 (S212).

On the other hand, if it is determined in step S203 that the video format has changed, the format detector 112 compares the latest format information with the immediately preceding format information to check if the resolution decreases (S204). If the resolution after the change increases, that is, if the number of pixels increases (N in S204), the format detector 112 executes the same processing as that executed when there is no change of the video format.

If it is determined in step S204 that the video format has changed to that of a lower resolution, the format detector 112 executes different processes depending on the degree of resolution decrease. In this embodiment, the format detector 112 executes different processes depending on whether the degree of resolution decrease is less than or equal to or larger than a predetermined degree. The degree of alteration as a threshold can be defined depending on whether or not the degree of resolution decrease makes the user experience strangeness, and can be set in advance in accordance with the video formats to be handled, and the number of video formats.

The digital broadcasting receiver 100 of this embodiment handles three different video formats, that is, OverHD, HD, and SD in descending order of resolution. If the resolution decreases by one level from OverHD to HD or from HD to SD, the format detector 112 determines that the degree of resolution decrease is less than the predetermined degree. On the other hand, if the resolution decreases by two levels from OverHD to SD, the format detector 112 determines that the degree of resolution decrease is equal to or larger than the predetermined degree.

As other criteria, the ratio of decrease of the number of pixels may be used. In this case, the format detector 112 executes different processes depending on whether or not the ratio of decrease of the number of pixels is equal to or higher than a threshold. Note that a combination of "less than" and "equal to or larger than" in the checking step may be replaced by that of "equal to or smaller than" and "larger than".

If it is determined in step S204 that the degree of resolution decrease is less than the predetermined degree, the format detector 112 acquires data of message 1 from the memory 113, and outputs the acquired data to the image composition unit 106 (S205). This corresponds to the case of the change of OverHD→HD or HD→SD. On the other hand, if it is determined that the degree of resolution decrease is equal to or larger than the predetermined degree, that is, if the change from OverHD to SD is detected, the format detector 112 acquires data of message 2 from the memory 113, and outputs the acquired data to the image composition unit 106 (S206).

Note that messages 1 and 2 have different contents, and are message information to be presented to the user as supplemental video pictures. The contents will be described later.

After that, the format detector 112 updates the format information stored in the memory 113 to information indicating that after the change (S207).

Subsequently, as described above, the scaling processor 105 applies the scaling processing to the video data (S208, S209). Since it is determined in step S210 that the message video picture to be synthesized is present, the image composition unit 106 superimposes the video of message 1 or 2 as a supplemental video picture on the video data, and outputs the video data to the video output unit 108 in step S211. Therefore, the image composition unit 106 outputs the video synthesized with that of message 1 or 2 to the display unit 110 (S212). Note that the message video picture synthesis processing is continuously executed until, for example, a predetermined period of time elapses or the user makes a predetermined operation of the remote controller 115.

Figure 3:
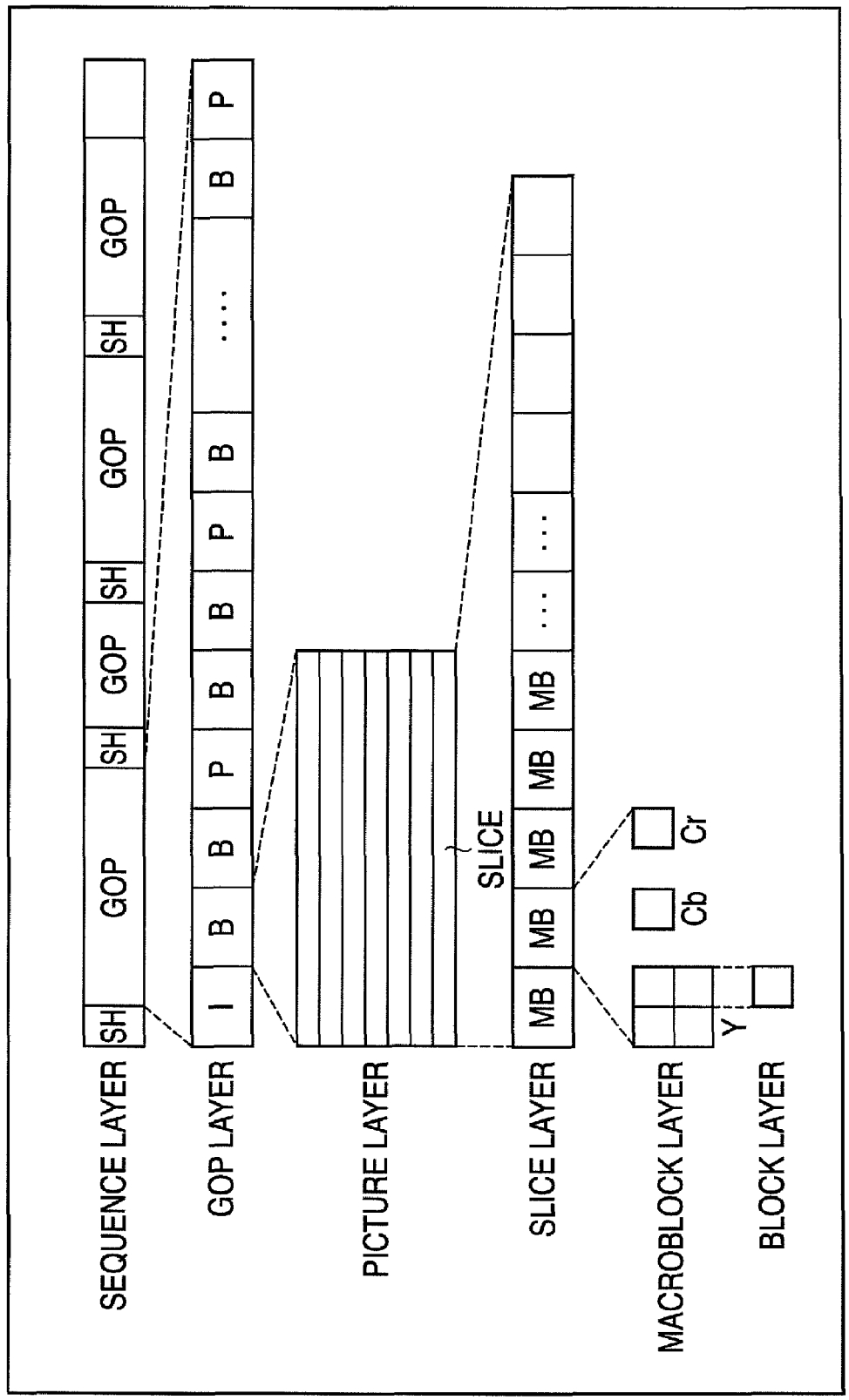
FIG. 3 shows the data structure of an MPEG2 video bitstream.

FIG. 3 shows the data structure of the MPEG2 video bitstream.

The bitstream has a hierarchical structure shown in FIG. 3. Layers are respectively called a sequence layer, GOP layer, picture layer, slice layer, macroblock layer, and block layer in the order from the top layer. Although a detailed description of the respective layers will not be given, each sequence header (SH) included in the sequence layer describes information of a corresponding GOP (e.g., resolution information (number of pixels), aspect ratio, image rate, and the like).

FIG. 4 shows data included in each sequence header, and some of their contents.

In this embodiment, the format detector 112 acquires information of HSV (Horizontal Size Value: lower 12 bits of the number of horizontal pixels of an image), HSE (Horizontal Size Extension: upper 2 bits to be added to the HSV), VSV (Vertical Size Value: lower 12 bits of the number of Vertical pixels of an image), and VSE (Vertical Size Extension: upper 2 bits to be added to the VSV), and specifies the resolution of video data from these pieces of information.

Figure 5A:
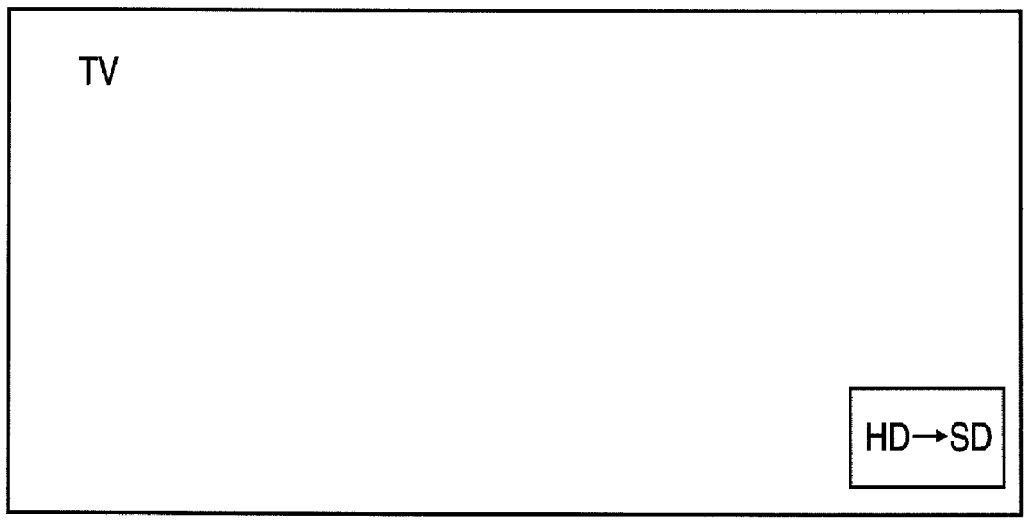
FIGS. 5A and 5B show an example of a message video picture displayed on the digital broadcasting receiver according to the first embodiment.
Figure 5B:
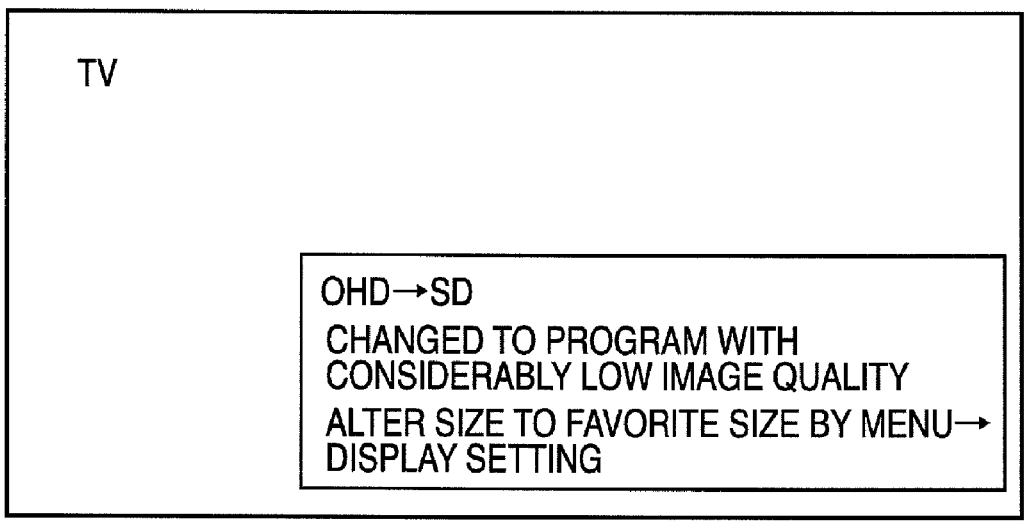

FIGS. 5A and 5B show display examples of states synthesized with the videos of messages 1 and 2.

As described above, when the degree of resolution decrease upon change of the video formats is relatively small (from OverHD to HD, from HD to SD, or the like), message 1 is selected, and is synthesized with the video data when it is displayed. When the degree of resolution decrease is relatively small, the user may experience strangeness but only slightly. For this reason, message 1 has contents indicating that the video format has changed, and the video format names before and after the change (FIG. 5A).

On the other hand, when the degree of resolution decrease upon change of the video formats is large (from OverHD to SD), message 2 is selected, and is synthesized with the video data when it is displayed. When the degree of resolution decrease is large, blurring due to the scaling processing becomes conspicuous, and the user may experience considerable strangeness. Then, the user may adjust something so as to improve the display quality. For this reason, message 2 has contents including a description indicating a guidance of an operation available for the user to improve the display quality in addition to the display of the format names indicated on message 1 (FIG. 5B).

As described above, message video pictures having different contents can be presented to the user as supplemental video pictures depending on the degree of resolution decrease upon change of the video formats. Particularly, when the resolution decreases to have a degree that makes the user experience considerable strangeness, a message including more detail contents than in the other case is presented. More specifically, the message including an explanation of the reason for the display quality drop and a guidance of an operation available for the user to improve the display quality is synthesized with the video data, and is output.

For this reason, the user can recognize not only that a considerable alteration in display quality is caused by the change of the video formats, but also an operation is required to improve the display quality, resulting in convenience.

Even when the resolution decreases upon change of the video formats, if the degree is relatively small, a small volume of information like only the format names before and after the change is displayed. For this reason, the display area of a message video picture can be small, and viewing of the content can be suppressed from being disturbed.

As described above, according to this embodiment, the detailed levels of messages to be displayed do not have one-to-one correspondence with the types of video formats after the change but have correspondence with the degrees of resolution decrease before and after the change. For this reason, even when the video format after the change remains the same, the message contents alter according to the video format before the change. In place of the correspondence between the absolute resolutions and detailed levels of messages, a message which responds well to the actual condition of strangeness that the user may experience can be displayed.

In this embodiment, the video format change is detected with reference to each sequence header in the MPEG2 video bitstream. However, the detection method is not limited to this. For example, "video_encode_format" in a "video decode control descriptor" in a program map table (PMT) as one of program specific information (PSI) which is included in the broadcast wave as well as EPG data may be referred to. In video_encode_format, information associated with the video format such as 1080p, 720p, and the like is described.

The video decode control descriptor is specified by Association of Radio Industries and Business (ARIB) for the purpose of informing the receiver of the operation sequence of the output side upon change of HD/SD so as to allow the receiver to attain a seamless change.

This embodiment has exemplified SD, HD, OverHD as three video formats having three different resolutions, and two types of contents of messages to be displayed as supplemental video pictures. However, a larger number of types of video formats and message contents can be used.

In this embodiment, although not particularly specified, the change of the video formats may be that in a single channel along with an elapse of time or that by the user who actively switches channels.

Second Embodiment

The second embodiment of the present invention will be described below. A video output apparatus according to this embodiment can have the same arrangement as that of the digital broadcasting receiver 100 described with reference to FIG. 1. The method of detecting the change of the video formats and the display timing of the message video picture are different from the first embodiment. Therefore, only the differences from the first embodiment in terms of the operation will be explained below. The same reference numerals denote the same components and the same operations as those in the first embodiment.

This embodiment detects the change of video formats using a component descriptor in an event information table (EIT) as one of PSI included in the broadcast wave as well as the EPG data. There are a plurality of types of EITs, and an EIT associated with the current and next programs in the current channel (EIT[present/following] is to be referred to as "EIT[p/f]" hereinafter) is used. With reference to "stream_content" and "component_type" of a component descriptor included in this EIT[p/f], whether or not the change of video formats will take place can be detected before the beginning of the next program.

Note that stream_content is a 4-bit identifier indicating a stream type (video, audio, data). Also, component_type is an 8-bit identifier that specifies information corresponding to each stream type (example: 1080i and aspect ratio=16:0 for video, dual-monaural for audio, and so forth).

Therefore, when the user keeps viewing the same channel, and the change of video formats will take place, he or she can be notified of a message that advises accordingly.

The operation of the digital broadcasting receiver 100 according to this embodiment will be described below with reference to the flowcharts shown in FIGS. 6 and 7.

FIG. 6 is a flowchart for explaining a message selection operation to be executed while the user is currently viewing a program.

During program viewing, whether or not a change of video formats will take place in the next program is detected based on the EIT[p/f], thereby selecting message data to be presented to the user. The controller 111 systematically issues a series of all processing execution instructions to the respective processors.

The data stream processor 104 acquires an EIT[p/f] from electronic program guide data and data broadcasting data periodically input from the demultiplexer 102 (S601). The format detector 112 acquires stream_content and component_ type values associated with the current and next programs from the acquired EIT[p/f] as information associated with the video format (S602). The format detector 112 compares the video format information of the current program and that of the next program in the same channel to check if their values have altered (S603).

If no alteration is detected, video data decoded by the decoder 103 is displayed on the display unit 110 via the scaling processor 105, image composition unit 106, and video output unit 108 as in the first embodiment. Note that the image composition unit 106 does not synthesize any message video picture.

On the other hand, if it is determined in step S603 that the video format has changed, the format detector 112 checks if the resolution of the next program decreases from that of the current program (S604). This checking step can be implemented by storing a table that associates the stream_content and component_type values with resolutions in the table 113 in advance and comparing the resolutions acquired with reference to this table. Also, a two-dimensional table which inputs the stream_content and component_type values, and outputs a value representing the direction and degree of resolution alteration may be prepared. For example, 8-bit values each of which includes stream_content in upper 4 bits and component_type in lower 4 bits may be generated in correspondence with the current and next programs, and that two-dimensional table may input a pair of values. In this case, the resolution decrease and its degree can be determined by a single table lookup process.

If the resolution increases, the format detector 112 executes the same processing as that executed when there is no change of the video format.

If it is determined in step S604 that the resolution decreases, the processing branches according to the degree of resolution decrease. Since the degree of resolution decrease can be determined by the same method as that described in the first embodiment, it will be briefly explained. That is, if the degree of resolution decrease is small, that is, if the video format changes from OverHD to HD or from HD to SD, the format detector 112 selects data of message 1 from message data stored in the memory 113 (S605). On the other hand, if the degree of resolution decrease is large, that is, if the video format changes from OverHD to SD, the format detector 112 selects data of message 2 from the memory 113 (S606). That is, in this stage, the image composition unit 106 does not synthesize any message video picture. In the arrangement in which the image composition unit 106 does not start the synthesis processing even when it receives message data but it does not receive any instruction from the controller 111, the message data may be output to the image composition unit 106 in step S605 or S606.

After that, the processes are repeated from step S601 until a timing at which the message video picture begins to be synthesized with the content video as a supplemental video picture is reached.

Figure 7:
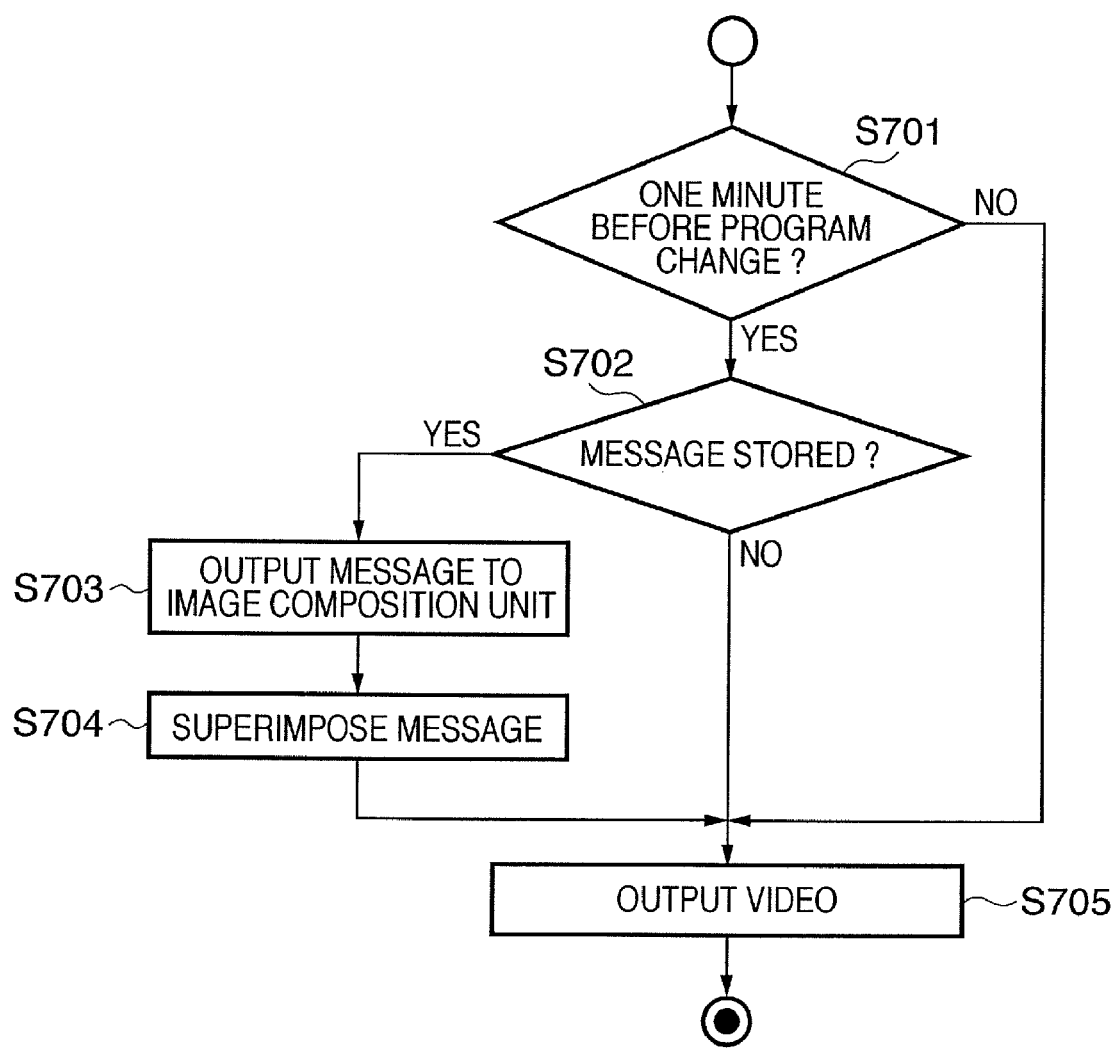
FIG. 7 is a flowchart for explaining processing for presenting a message video picture to the user in the digital broadcasting receiver according to the second embodiment.

FIG. 7 is a flowchart for explaining the processing for presenting a message video picture to the user. The processing in FIG. 7 is executed independently of that described with reference to FIG. 6.

Assume that the presentation timing of a message video picture to the user is one minute before the start of the next program. The controller 111 detects using an internal timer if one minute before the start of the next program is reached (S701). If one or more minutes remain, or if the remaining time is less than one minute, the controller 111 executes normal video output processing without synthesizing any message video picture (S705).

If one minute before the start of the next program is detected in step S701, the controller 111 checks if the memory 113 stores selected message data (S702). If the message data is stored, the controller 111 supplies that message data to the image composition unit 106. The image composition unit 106 synthesizes the message video picture with the content video and outputs the synthesized video to the video output unit 108 until a predetermined period of time elapses or the user makes a predetermined operation of the remote controller 115 (S703).

The contents of messages 1 and 2 are the same as the first embodiment. That is, if the degree of resolution decrease is small, the message has contents that merely notify a change of the format. On the other hand, if the degree of resolution decrease is large, the message has contents including a description indicating the setting alteration sequence that the user will execute upon change of programs.

As described above, according to this embodiment, different message video pictures according to the degree of resolution decrease upon change of the video formats are presented to the user before the video format changes. For this reason, the user can make an alteration operation of the display method before a desired program starts. As the alteration operation of the display method, the user may set the upper limit value of a scale-up ratio in the scaling processing, or may designate a size after the scale-up processing.

In this embodiment, the presentation timing of a message video picture to the user and the number of timings are once one minute before. However, the present invention is not limited to this. For example, the message video picture may be presented at a timing before one minute, or the message video picture may be presented a plurality of times, for example, 10 seconds before again.

Third Embodiment

The third embodiment of the present invention will be described below.

In the first and second embodiments, as for resolution decrease upon change of video formats, a message video picture having information according to the degree of resolution decrease is provided, thus improving user's convenience.

With this message, a surprise that the user may experience and an anxiety of the user who does not know how to improve the display quality upon sudden alteration of the display quality can be eliminated. However, each individual user must decide whether or not to make an operation for improving the display quality.

The third embodiment is characterized in that the scaling processing is automatically altered upon change of the video formats, and a considerable alteration in display quality can be suppressed without any user's operation.

Figure 8:
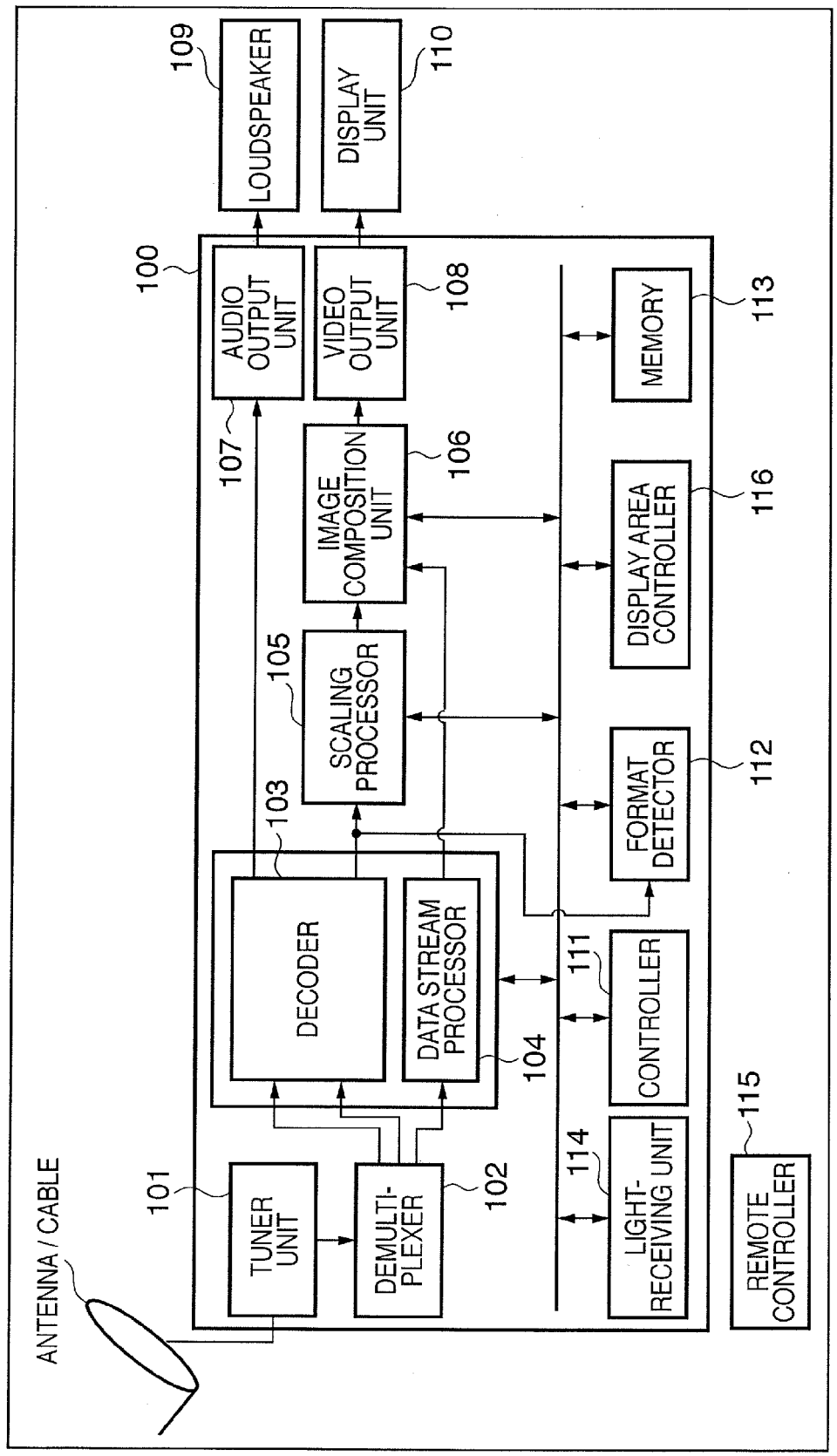
FIG. 8 is a block diagram showing an example of the functional arrangement of a digital broadcasting receiver as a typical example of a video output apparatus according to the third embodiment of the present invention.

FIG. 8 is a block diagram showing an example of the functional arrangement of a digital broadcasting receiver 800 as a typical example of a video output apparatus according to the third embodiment of the present invention. The same reference numerals in FIG. 8 denote the same components as in FIG. 1, and a repetitive description thereof will be avoided. As can be seen from comparison between FIGS. 8 and 1, the digital broadcasting receiver 800 comprises a display area controller 116 in addition to the arrangement of the digital broadcasting receiver 100 in FIG. 1.

The display area controller 116 controls a display area of a video to be output according to the degree of resolution decrease upon change of the video formats. The display area controller 116 receives resolution information from the format detector 112, and determines a scale ratio. The display area controller 116 determines the display position on the display unit 110 in accordance with the resolution after the determined scale ratio is applied. The display area controller 116 notifies the scaling processor 105 of the scale ratio and the image composition unit 106 of the display position (coordinate information).

The scaling processor 105 executes scaling processing according to the scale ratio notified from the display area controller 116. The image composition unit 106 outputs video data to the video output unit 108 so that a video is displayed at the display position notified from the display area controller 116.

Figure 9:
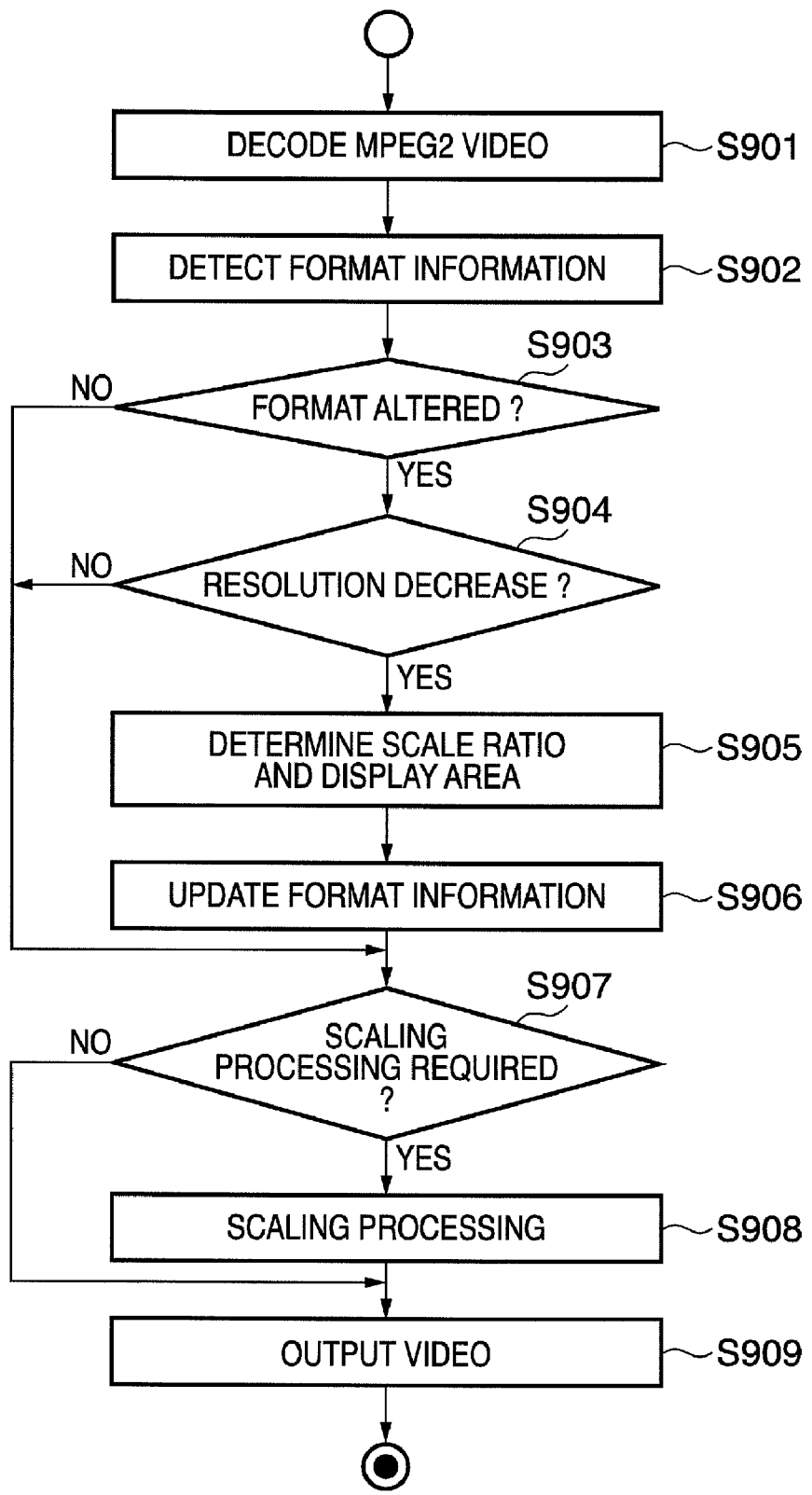
FIG. 9 is a flowchart for explaining an overview of receiving processing in the digital broadcasting receiver according to the third embodiment.

An overview of the receiving processing in the digital broadcasting receiver 800 according to this embodiment will be described below with reference to the flowchart of FIG. 9. The receiving processing is implemented when the controller 111 controls and uses other units.

The decoder 103 applies decoding processing to an MPEG2 video bitstream input from the demultiplexer 102 (S901). The format detector 112 acquires video format information from the decoding result of the decoder 103. More specifically, the format detector 112 acquires resolution information described in a sequence header (SH) included in the sequence layer of the MPEG2 video bitstream, and saves the acquired information in the memory 113 (S902). In this embodiment, the format detector 112 acquires video format information from all sequence headers in the bitstream.

The format detector 112 compares the acquired video format information with the immediately preceding video format information saved in the memory 113 to check if the contents have altered (S903). If no alteration is detected, the format detector 112 executes only processing for notifying the scaling processor 105 of the acquired video format information.

The scaling processor 105 checks in step S907 based on the video format information from the format detector 112 and the number of pixels of the display unit 110 whether or not the scaling processing is required.

If it is determined that the scaling processing is required, the scaling processor 105 applies the scaling process (scale-up processing) to the video data without altering the current scale ratio (S908); otherwise, it outputs the video data intact to the image composition unit 106. The image composition unit 106 outputs the video data to the video output unit 108 to display the input video data on the display area set so far without altering any settings. The video output unit 108 outputs the input video data to the display unit 110 (S909).

On the other hand, if it is determined in step S903 that the video format has changed, the format detector 112 compares the latest format information with the immediately preceding format information to check if the video format has changed to the format with a lower resolution (S904). If the resolution after the change increases, that is, if the number of pixels increases (N in S904), the format detector 112 executes the same processing as that executed when there is no change of the video format.

If it is determined in step S904 that the resolution decreases, the display area controller 116 determines a scale ratio and display area based on the resolutions of the video formats before and after the change, and notifies the scaling processor 105 of the scale ratio and the image composition unit 106 of the display area (S905). The determination method of the scale ratio and display area will be described later.

After that, the format detector 112 updates the format information stored in the memory 113 to information indicating that after the change (S906).

Subsequently, the scaling processor 105 applies scaling processing based on the scale ratio and display area set by the display area controller 116 (S908), and the image composition unit 106 controls the display area to output a video from the video output unit 108 (S909).

Details of the determination processing of the scale ratio and display area executed by the display area controller 116 in step S905 will be described below. In this embodiment, the display area controller 116 determines the scale ratio and display area based on a conversion table prepared in advance.

FIG. 10 shows an example of the conversion table.

The conversion table is pre-stored in the memory 113. In this embodiment, the conversion table has a configuration in which the scale ratios and display areas for a video after the change are stored in association with four combinations of video formats that cause resolution decrease before and after the change. In the following description, a combination of video formats before and after the change is called a mode.

Note that the scale ratio is a scale-up ratio of an original video, and uses a common value in the vertical and horizontal directions in this embodiment. For example, in case of a scale ratio=3.5, the height and width of an original video are multiplied by 3.5. The display area is a value indicating the display position and size on a displayable area (4000×8000 pixels) of the display unit 110. In this embodiment, the display area represents (X- and Y-coordinates of the upper left vertex of the display area, width, height) using a pixel unit when the upper left of the screen of the display unit 110 is defined as an origin (0, 0), the right direction is defined as an X-axis, and the down direction is defined as a Y-axis.

Four modes will be described below. In both modes 1 and 2, the video format before the change is OverHD (4000×8000 pixels), and the scale ratio is 1.0. Therefore, the display area is (0, 0, 8000, 4000). Mode 1 corresponds to a case in which the video format changes from this state to HD (1080×1920 pixels), and mode 2 corresponds to a case in which the video format changes from this state to SD (480×720 pixels).

Mode 3 corresponds to a case in which the video format changes from a state in which the format before the change is HD and scale-up display is made at a scale ratio=3.7 (display area (448, 2, 7104, 3396)) to SD.

The combination of the video formats before and after the change of mode 4 is common to that of mode 3, except that the scale ratio of an HD video before the change is 3.5 (display area (640, 110, 6720, 3780)).

In other modes, for example, in combinations of video formats that increase the resolution after the change, a video after the change is displayed to use the displayable area of the display unit 110 as much as possible as in the first and second embodiments. In this embodiment, since the scale ratio is common to both the vertical and horizontal directions, a video having an aspect ratio different from that of the display unit 110 is fully scaled up within the range in which the video is not cut. If the resolution remains the same before and after the change, the same display area is continuously used. This is because the image quality does not drop considerably before and after the change of contents.

In this embodiment, the scale ratio for a video after the video format has changed can be determined as follows.

It is preferable for an alteration corresponding to the ratio of resolutions before and after the change which falls within the range from 10 to 100 to determine the scale ratio so that the ratio of scale ratios after and before the change falls within the range from 2.0 to 4.0. In this case, the ratio of scale ratios decreases with decreasing resolution after the change.

It is preferable for an alteration corresponding to the ratio of resolutions before and after the change which is less than 10 to determine the scale ratio so that the ratio of scale ratios after and before the change falls within the range from 1.0 to 2.0.

Note that the value is determined so that the number of pixels after scaling is smaller than the number of displayable pixels of the display unit 110.

In the example of FIG. 10, the ratios of resolutions before and after the change are mode 1: (4000×8000)/(1080×1920)=15.4
mode 2: (4000×8000)/(480×720)=92.6
modes 3 and 4: (1080×1920)/(480×720)=6

Therefore, in modes 1 and 2, the scale ratios are respectively set to be 3.5 and 3.0, and the ratios of scale ratios are respectively 3.5 and 3.0.

In modes 3 and 4, the scale ratios are respectively set to be 7.0 and 6.0, and the ratios of scale ratios are respectively 1.9 and 1.7.

The display area is determined so that a video after the change is displayed at the center of the screen of the display unit 110.

In this way, even when the degree of resolution decrease is large, if the resolution of a video after the change is low, the scale ratio is prevented from being excessively increased. When the degree of resolution decrease is not so large, an alteration in scale ratio is suppressed. With such control, a considerable alteration in display quality can be suppressed.

Figure 11:
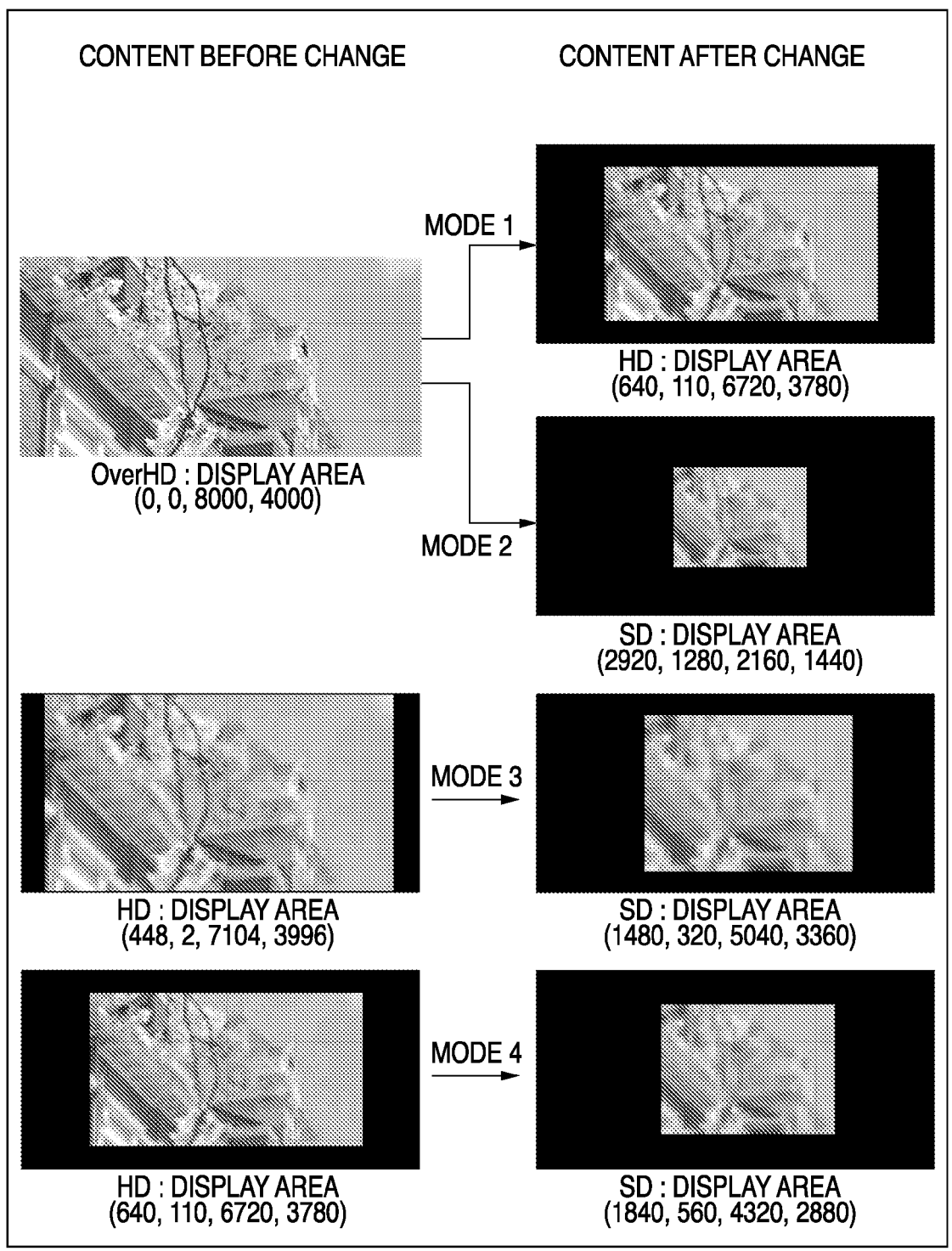
FIG. 11 illustrates display control according to the table in FIG. 10 using images.

FIG. 11 illustrates display control according to the table in FIG. 10 using images. In FIG. 11, the same image is used before and after the change for the purpose of quality comparison. Also, a display area of the image after the change is not accurate, particularly in mode 2. This is because an image becomes too small if it is described to have an accurate size.

When the user gets used to the image quality on the output display area, he or she may want to view a larger display area or a still smaller display area. Under the assumption of such a situation, the user may manually alter the scale ratio by operating the remote controller 115. As for the display position, the user may also similarly alter it.

Note that in place of a manual alteration in scale ratio by the user, for example, the display area controller 116 may execute control to gradually scale up the display area as an elapse of the viewing time and to approach full-screen display.

In this embodiment, when the resolution after the change increases, full-screen display is made. However, the display operation may be altered according to the degree of resolution increase. For example, when the video format changes from, for example, a state in which SD is displayed using the display area (2920, 1280, 2160, 1440) (scale ratio=3.0) to HD, the degree of resolution increase is greatly smaller than the change to OverHD. In this case, control may be made to maintain the scale ratio (3.0) without scaling the HD content to be full-screen displayed (scale ratio=3.7).

Likewise, when changing from a state in which the user manually alters the scale ratio of an SD video to 3.7 or lower to an HD video, the HD video may be scaled at the scale ratio altered by the user.

As described above, according to this embodiment, the scaling ratio that suppresses any considerable display quality drop is automatically set in accordance with the degree of resolution decrease, thus saving the user the trouble of setting it manually.

Note that the second embodiment may be combined with this embodiment upon practice. In this case, messages 1 and 2 may include contents indicating execution of automatic settings like "if viewing is continued, the display method is automatically altered" and the like.

In this embodiment, the display area controller 116 determines the scale ratio and display area, and sets them in the scaling processor 105. However, if the scale ratio is determined, the numbers of pixels of an image in the vertical and horizontal directions after the scaling processing are determined. The number of displayable pixels of the display unit 110 remains unchanged. Therefore, when a video is always displayed in the center of the screen, the display area need not be explicitly determined and designated, and the image composition unit 106 may determine the display position.

Fourth Embodiment

The fourth embodiment of the present invention will be described below.

The fourth embodiment is characterized in that a GUI (Graphical User Interface) that prompts the user to alter the display area is displayed in place of a message video picture in the second embodiment and, in particular, the video of message 2 including the guidance.

Only differences from the second embodiment will be described below.

In this embodiment as well, the GUI that prompts the user to alter the display area is displayed at a timing before the change of video formats. As a result, the user can alter the display area to a desired size before the beginning of a program that he or she wants to view.

The GUI is displayed in such a manner that the controller 111 acquires GUI data stored in advance in the memory 113, and sets the GUI data in the image composition unit 106 to output it. That is, the common receiving operation is done except that the object to be selected in step S606 in FIG. 6 and the object to be output to the image composition unit 106 in step S703 in FIG. 7 are altered from the data of message 2 to the GUI data. Also, in this embodiment, the GUI display timing is the same as that of the message video picture in the second embodiment (one minute before the change).

FIGS. 12A to 12C show examples of GUIs to be displayed in this embodiment.

The digital broadcasting receiver 100 of this embodiment superimposes a GUI 1201 on a screen 1202 of the display unit 110 one minute before a program changes (FIG. 12A). In this case, assume that a video of the OverHD format is displayed currently. In this state, upon detection of the change to SD based on an EIT[p/f], the GUI 1201 is displayed in place of the video of message 2. The GUI 1201 includes a massage which informs the user that the image quality of the next program will drop considerably if he or she continues viewing. With this message, the user can recognize that the image quality will drop considerably in the next program.

The GUI 1201 also includes a message that inquires the user as to whether or not to immediately alter the settings of the display area, and buttons 1206 that the user can select using the remote controller 115. Note that the controller 111 recognizes designation of one of these buttons 1206 via the light-receiving unit 114.

When the user designates "No", the controller 111 clears the GUI 1201, and the next program is displayed after its video data is scaled to the same display area (full screen) as the current display area.

When the user requests to alter the display area on the GUI 1201, that is, when he or she designates a "Yes" button, the controller 111 controls the respective units to display a down-converted image 1203 by down-converting a currently displayed video on a predetermined default display area (FIG. 12B). The controller 111 reads out data of a guidance display 1204 that explains the operation method required to alter the display area from the memory 113, and outputs the readout data to the image composition unit 106 so as to superimpose the guidance. Note that the default display area may be determined for each video format after the change or may be determined using the conversion table described in the third embodiment.

By displaying the down-converted image, the user can alter the display area while actually confirming the display quality which will be obtained in the next program.

The user alters the display area to a desired position and size using the remote controller 115 in accordance with the guidance display 1204. At this time, since the controller 111 alters in real time the scale ratio and display area of the down-converted image 1203 according to instructions input from the remote controller 115, the user can determine the display area that can assure desired display quality while confirming the contents displayed on the screen.

When the user presses an enter key of the remote controller 115 to determine the desired display area, the controller 111 fixes the display area at that timing. Finally, the controller 111 displays a message video picture 1205 that describes the setting sequence required to alter the display area again (FIG. 12C). The message video picture 1205 is automatically cleared after it is displayed for a predetermined period of time.

As described above, according to this embodiment, when the resolution decreases upon change of the video formats and its degree is large, the GUI that inquires the user as to whether or not to alter the display area is displayed in advance. When the user instructs to alter the display area, a setting state of the display area immediately appears. For this reason, the user can immediately set the display area without searching for a menu screen or the like required to alter the display area.

Note that this embodiment has been explained on the premise of the second embodiment. Alternatively, the GUI 1201 may be displayed in place of the video of message 2 in the first embodiment. In this case, when it is detected using the sequence header of MPEG2 video that the degree of resolution decrease is large after the change of programs, the GUI 1201 is displayed.

Fifth Embodiment

The fifth embodiment of the present invention will be described below.

This embodiment is characterized in that the detection target of the video format change is extended to an input content from an external device in the first embodiment.

Therefore, only differences from the first embodiment will be described below.

Figure 13:
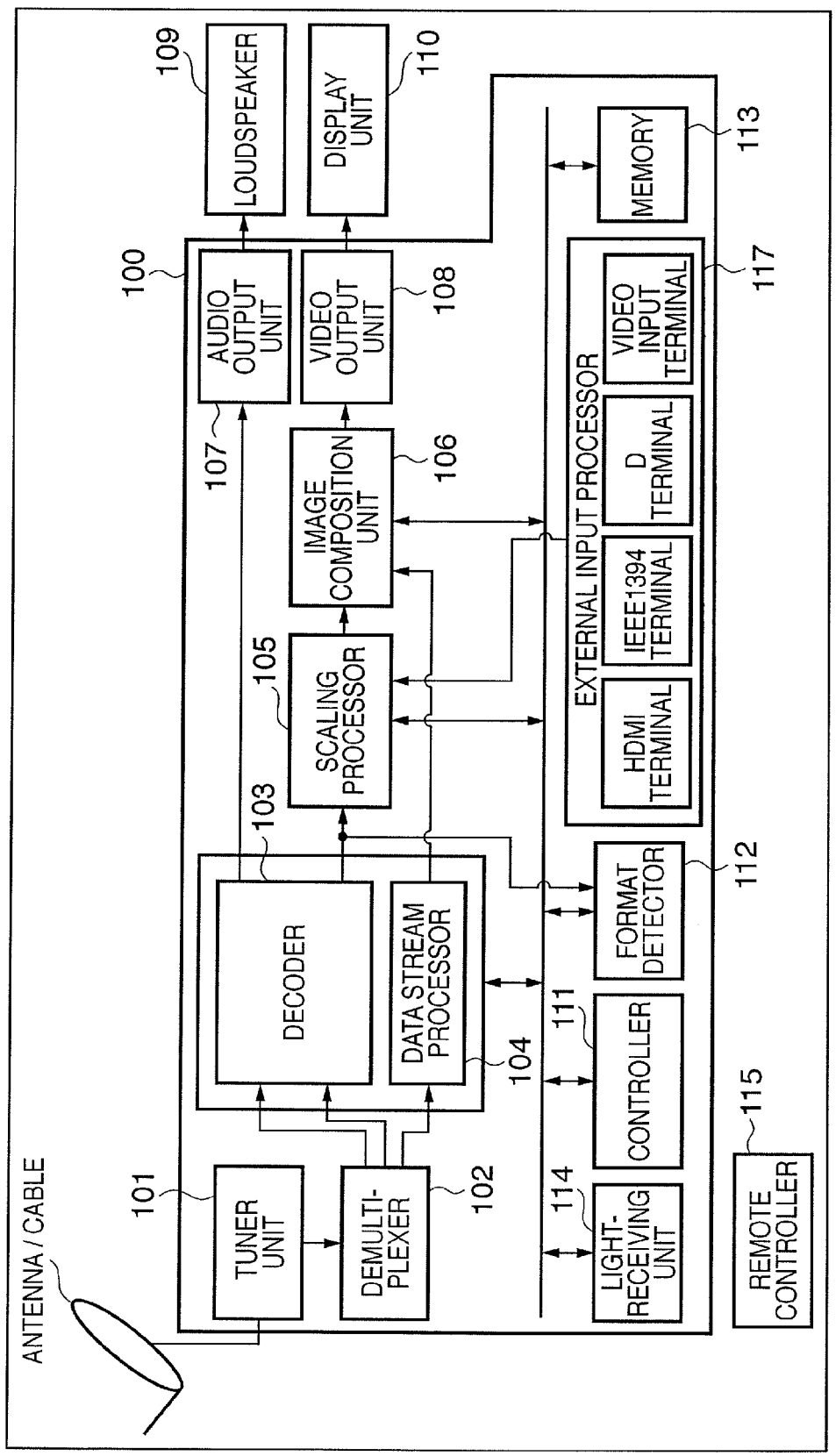
FIG. 13 is a block diagram showing an example of the functional arrangement of a digital broadcasting receiver as a typical example of a video output apparatus according to the fifth embodiment of the present invention.

FIG. 13 is a block diagram showing an example of the functional arrangement of a digital broadcasting receiver 1300 as a typical example of a video output apparatus according to the fifth embodiment of the present invention. A difference from the arrangement of the first embodiment lies in that the receiver 1300 comprises an external input processor 117.

Since the external input processor 117 is added, not only the change of video formats in the broadcasting content but also the change of video formats upon change from the broadcasting content to an external input content, that from the external input content to the broadcasting content, and that from the external input content to another external input content can be detected.

The external input processor 117 has four interface terminals, that is, an HDMI (High Definition Multimedia Interface) terminal, IEEE1394 terminal, D terminal, and video input terminal (composite terminal) in this embodiment.

The specification of the HDMI is designed for AV home appliances by adding an audio transmission function, copyright protection function, color-difference transmission function, and the like to a DVI (Digital Visual Interface) as a standard for a connection interface between a PC and display.

The IEEE1394 is a standard for an interface used to connect AV devices and PCs, and allows exchange of various data. The IEEE1394 is mainly used to connect a DVC (Digital Video camera) and PC, and so forth.

The D terminal is a Japan-specific standard designed to connect analog video signals of video devices. Basically, the D terminal is a combination of terminals so as to connect input and output component video signals via a single cable, and also allows to transmit identification signals of the number of scan lines, scan type, aspect ratio, and the like.

The video input terminal (composite terminal) is a video input/output terminal used in general television receivers and video devices. This terminal is used for composite video signals, and is adopted in NTSC and the like.

Upon detection of a signal input from each of these connection terminals, the external input processor 117 acquires its resolution information. As the input from the video input terminal, the external input processor 117 determines its resolution as SD or equivalent. As for the inputs from other connection terminals, the external input processor 117 acquires resolution information from the format or identification signals of an input content. The processor 117 then records the resolution information in the memory 113.

For example, the external input processor 117 can acquire the resolution information as follows. In case of a video device of the D-VHS or HDV standard connected via the IEEE1394 terminal, a content is recorded in the MPEG2 format. For this reason, the external input processor 117 can acquire the resolution information from each sequence header (SH) of an MPEG2 video bitstream as in a broadcasting content. In case of another device connected via the IEEE1394 terminal, the processor 117 can acquire the resolution information using "RECORDING SPEED Command"

specified by IEEE1394TA AV/C Tape Recorder/Player Subunit in case of, for example, a tape device, depending on devices.

In case of a device connected via the HDMI terminal, since video data is transferred without being compressed, the external input processor 117 can acquire the resolution information by directly analyzing the data. The processor 117 can also acquire the resolution information using a control protocol such as CEC (Consumer Electronics Control) or the like.

For example, assume that the user has changed an input source of a video content via the remote controller 115 during reception and display of a broadcast wave. In this case, the format detector 112 compares the resolution information acquired by the external input processor 117 with the immediately preceding resolution information stored in the memory 113 to confirm if the resolution alters. The subsequent processes are executed according to the presence/absence, direction (resolution decrease/increase), and degree of alteration as in the first embodiment.

In this way, upon change of video formats between arbitrary contents (e.g., a broadcast content and externally input content), the degree of resolution decrease before and after the change can be detected, and the same effects as in the first embodiment can be obtained.

Note that this embodiment adopts the arrangement that additionally includes the external input processor based on the first embodiment. Alternatively, the arrangement in which the external input processor is added to the digital broadcasting receiver 800 according to the third embodiment may be adopted.

In the above example, the receiver has the four external interfaces. Alternatively, the receiver can comprise a larger number of interfaces or different types of interfaces as long as the video formats of contents can be specified.

Other Embodiments

The aforementioned embodiments can be implemented by software by a computer (or a CPU, MPU, or the like) of a system or apparatus.

Therefore, a computer program itself supplied to in the computer to implement the aforementioned embodiments using the computer implements the present invention. That is, the computer program itself for implementing the functions of the aforementioned embodiments is one embodiment of the present invention.

Note that the form of the computer program which implements the aforementioned embodiments is not particularly limited as long as it is computer-readable. For example, the program may adopt the forms of an object code, a program to be executed by an interpreter, script data to be supplied to an OS, and the like, but the present invention is not limited to them.

The computer program which implements the aforementioned embodiments is supplied to the computer via a storage medium or wired/wireless communications. As the storage medium for supplying the program, for example, magnetic storage media such as a flexible disk, hard disk, magnetic tape, and the like, optical/magneto-optical storage media such as an MO, CD, DVD, and the like, a nonvolatile semiconductor memory, and so forth may be used.

As a program supply method using the wired/wireless communications, a method using a server on a computer network is available. In this case, a server stores a data file (program file) that can be a computer program which forms the present invention. The program file may be either an executable format file or source codes.

Then, the program file is supplied by downloading to a client computer that has accessed the server. In this case, the program file may be segmented into a plurality of segment files, which may be allocated on different servers.

That is, the server which provides the program file for implementing the aforementioned embodiments to the client computer is also one embodiment of the present invention.

Also, a storage medium, which stores the encrypted program which implements the aforementioned embodiments, may be delivered to the user, and key information required to decrypt the encrypted program may be supplied to the user who meets a predetermined condition, so as to allow to install the program on a computer of the user. The key information can be supplied to the user by making him or her download it from a home page via, for example, the Internet.

The computer program for implementing the aforementioned embodiments may use the functions of an OS which already runs on the computer.

Furthermore, some functions of the computer program for implementing the aforementioned embodiments may be configured by firmware of an expansion board or the like attached to the computer, or may be executed by a CPU of the expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-243398, filed Sep. 7, 2006, which is hereby incorporated by reference herein in its entirety.

The invention claimed is:

1. A video output apparatus which comprises input means for inputting a video content having at least three different resolutions, and output means for outputting a video associated with the video content, characterized by comprising:
    detection means for detecting an alteration of a resolution of the video content;
    scaling means for scaling up the video content at a set scale ratio and supplying the scaled-up video content to the output means; and
    control means for, when said detection means detects the alteration of the resolution, selecting one of a plurality of supplemental video pictures, which are prepared in advance, in accordance with a degree of resolution decrease from the resolution before the alteration to the resolution after the alteration, and controlling the output means to output the selected supplemental video picture together with a video associated with the video content.

2. The apparatus according to claim 1, characterized in that the supplemental video pictures are message video pictures, and said control means selects a message video picture including a detailed message as the degree of resolution decrease is larger.

3. The apparatus according to claim 1, characterized in that when the degree of resolution decrease is larger than a predetermined degree, said control means selects, as the supplemental video picture, a GUI that inquires a user as to whether or not to alter a setting of the scale ratio, and when the degree of resolution decrease is not more than the predetermined degree, said control means selects a message video picture as the supplemental video picture.

4. A video output apparatus which comprises input means for inputting a video content having at least three different resolutions, and output means for outputting a video associated with the video content, characterized by comprising:

detection means for detecting an alteration of a resolution of the video content;

scaling means for scaling up the video content at a set scale ratio and supplying the scaled-up video content to the output means; and setting means for, when said detection means detects the alteration of the resolution, determining the scale ratio for the video content after the alteration in accordance with a degree of resolution decrease from the resolution before the alteration to the resolution after the alteration, and setting the determined scale ratio in said scaling means.

5. The apparatus according to claim 4, characterized in that when a value of a ratio between the resolutions before and after the alteration is smaller than a predetermined value, said setting means determines the scale ratio for the video content after the alteration so that an alteration between a scale ratio for the video content before the alteration and a scale ratio for the video content after the alteration becomes smaller than a predetermined value.

6. The apparatus according to claim 4 or 5, characterized in that when the value of the ratio between the resolutions before and after the alteration is not less than the predetermined value, said setting means determines the scale ratio for the video content after the alteration so as to reduce a value of (the scale ratio for the video content after the alteration/the scale ratio for the video content before the alteration as the resolution of the video content after the alteration) is lower.

7. The apparatus according to claim 1 or 4, characterized in that said detection means detects the alteration of the resolution of the video content at a change timing of the video content.

8. The apparatus according to claim 1 or 4, characterized in that said detection means detects that the alteration of the resolution of the video content will take place before a change timing of the video content.

9. The apparatus according to claim 1 or 4, characterized in that the input means inputs the video content via a broadcast wave.

10. The apparatus according to claim 9, characterized by further comprising interface means for inputting a video content from an external device, wherein said detection means detects an alteration of a resolution for the video content input via said interface means in addition to the video content input via the broadcast wave.

11. A method of controlling a video output apparatus, which comprises input means for inputting a video content having at least three different resolutions, and output means for outputting a video associated with the video content, said method characterized by comprising:

a detection step of detecting an alteration of a resolution of the video content;

a scaling step of scaling up the video content at a set scale ratio and supplying the scaled-up video content to the output means; and a control step of selecting, when the alteration of the resolution is detected in the detection step, one of a plurality of supplemental video pictures, which are prepared in advance, in accordance with a degree of resolution decrease from the resolution before the alteration to the resolution after the alteration, and controlling the output means to output the selected supplemental video picture together with a video associated with the video content.

12. A method of controlling a video output apparatus, which comprises input means for inputting a video content having at least three different resolutions, and output means for outputting a video associated with the video content, said method characterized by comprising:

a detection step of detecting an alteration of a resolution of the video content;

a scaling step of scaling up the video content at a set scale ratio and supplying the scaled-up video content to the output means; and a setting step of determining and setting, when the alteration of the resolution is detected in the detection step, the scale ratio for the video content after the alteration in accordance with a degree of resolution decrease from the resolution before the alteration to the resolution after the alteration.

* * * * *